United States Patent
Wang et al.

(10) Patent No.: US 8,928,836 B2
(45) Date of Patent: Jan. 6, 2015

(54) BACKLIGHT MODULE AND LIQUID CRYSTAL DISPLAY DEVICE

(71) Applicant: Shenzhen China Star Optoelectronics Technology Co., Ltd., Guangdong (CN)

(72) Inventors: Jiaqiang Wang, Shenzhen (CN); Gang Yu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 183 days.

(21) Appl. No.: 13/695,435

(22) PCT Filed: Oct. 29, 2012

(86) PCT No.: PCT/CN2012/083684
§ 371 (c)(1),
(2) Date: Oct. 31, 2012

(87) PCT Pub. No.: WO2014/063372
PCT Pub. Date: May 1, 2014

(65) Prior Publication Data
US 2014/0118662 A1    May 1, 2014

(30) Foreign Application Priority Data

Oct. 25, 2012  (CN) .......................... 2012 1 0413161

(51) Int. Cl.
*G02F 1/1333* (2006.01)
*G02F 1/1335* (2006.01)

(52) U.S. Cl.
USPC .............................................. 349/58; 349/65

(58) Field of Classification Search
CPC ........................................... G02F 2001/133314
USPC ....................................................... 349/58, 65
See application file for complete search history.

(56) References Cited

U.S. PATENT DOCUMENTS 7,782,418 B2 *   8/2010   Ke et al. .......................... 349/58
2013/0044462 A1 *   2/2013   Cheng .......................... 362/97.1

* cited by examiner

*Primary Examiner* — James Dudek
(74) *Attorney, Agent, or Firm* — Andrew C. Cheng (57) ABSTRACT

The present invention provides a backlight module and a liquid crystal display device. The backlight module which comprises a waveguide including a light exiting surface, and a side surface adjoining the light-exiting surface. An optical film includes a main portion disposed on the existing surface of the waveguide, and a skirt extends from a peripheral of the main portion and adjoining to the side surface of the light-exiting surface. A backboard includes a base and an upright extending from peripheral of the base, the waveguide is disposed on the base, and the upright is spaced with the skirt; and wherein a retaining device is supportably arranged between the upright and the skirt so as to press the skirt onto the side surface of the waveguide. The present invention can effectively reduce the estate of the backboard, and is beneficial to the design narrow-border of liquid crystal display device.

20 Claims, 6 Drawing Sheets

BACKLIGHT MODULE AND LIQUID CRYSTAL DISPLAY DEVICE

FIELD OF THE INVENTION

The present invention relates to a technical field of liquid cry stall display, and more particularly, to a backlight module and a liquid crystal display device incorporated with such a backlight module.

DESCRIPTION OF PRIOR ART

Backlight module is a vital component or module for a liquid crystal display device, and it generally includes an optical film, a waveguide, and a backboard. During the assembling of the backlight module, the optical film has to be properly positioned therein. Currently, the optical film is positioned by means of a rivet or dowel pin or the like. However, the rivet occupies a great amount of estate of the backboard, and this is detrimental to the trend of narrow-border of the liquid crystal display panel. As a result, there is a requirement for improving the existing configuration.

SUMMARY OF THE INVENTION

It is an object of the present invention to provide a backlight module and a liquid crystal display device in which the configuration of the backlight module is simplified and it beneficial to the design of a narrow-border of the liquid crystal display device.

In order to resolve the issue encountered by the prior art, the present invention provides a technical solution by introducing a backlight module which comprises a waveguide including a light exiting surface, and a side surface adjoining the light-exiting surface. An optical film includes a main portion disposed on the existing surface of the waveguide, and a skirt extends from a peripheral of the main portion and adjoining to the side surface of the light-exiting surface. A backboard include a base and an upright extending from peripheral of the base, the waveguide is disposed on the base, and the upright is spaced with the skirt, a retaining slot defined in the backboard. A retaining device is attached to the backboard, and includes a depressing portion and a fixture arranged onto the depressing portion, and the depressing portion is supportably arranged between the upright and the skirt so as to press the skirt onto the side surface of the waveguide; and wherein the depressing portion has a plate-like configuration and includes a pair of main surfaces opposite to each other, and a bridge portion interconnecting the pair of main surfaces, one of the main surface is in contact with the skirt, and the other of the maw surfaces is in contact with the upright, wherein the retaining slat is defined in the upright or the bridge, wherein the retaining device is arranged on one of the main surfaces or the bridge.

Wherein the fixture has a T-like configuration.

Wherein the depressing portion and the fixture are integrally formed with an elastic material.

Wherein the optical film includes a first optical sheet, and a second optical sheet stacked together, a skirt of the first optical sheet and a skirt of the second optical sheet are offset from each other on the side surface of the waveguide, wherein the retaining device presses the skirts of the first and second optical sheets onto the side surface of the waveguide.

Wherein a bending angle of the skirt is less than 90 degrees.

In order to resolve the issue encountered by the prior art, the present invention provides a technical solution by introducing a backlight module which comprises a waveguide including a light exiting surface, and a side surface adjoining the light-exiting surface. An optical film includes a main portion disposed on the existing surface of the waveguide, and a skirt extends from a peripheral of the main portion and adjoining to the side surface of the light-exiting surface. A backboard includes a base and an upright extending from peripheral of the base, the waveguide is disposed on the base, and the upright is spaced with the skirt; and wherein a retaining device is supportably arranged between the upright and the skirt so as to press the skirt onto the side surface of the waveguide.

Wherein the retaining device is securely attached to the backboard.

Wherein the retaining device includes a depressing portion and a fixture arranged onto the depressing portion, and wherein the backboard is defined with a retaining slot in which the depressing portion inserted therein, wherein the depressing portion presses the skirt toward the side surface of the waveguide.

Wherein the depressing portion has a plate-like configuration and includes a pair of main surfaces opposite to each other, one of the main surface is in contact with the skirt, and the other of the main surfaces is in contact with the upright, wherein the retaining slot is defined in the upright.

Wherein the fixture has a T-shape configuration, and the depressing portion and the fixture are integrally formed with an elastic material.

Wherein the depressing portion has a plate-like configuration and includes a pair of main surfaces opposite to each other, and a bridge portion interconnecting the pair of main surfaces, one of the main surface is in contact with the skirt, and the other of the main surfaces is in contact with the upright, wherein the retaining slot is defined in the upright or the bridge, wherein the retaining device is arranged on one of the main surfaces or the bridge.

Wherein the fixture has a T-shape configuration, and the depressing portion and the fixture are integrally formed with an elastic material.

Wherein the optical film includes a first optical sheet, and a second optical sheet stacked together, a skirt of the first optical sheet and a skirt of the second optical sheet are offset from each other on the side surface of the waveguide, wherein the retaining device presses the skirts of the first and second optical sheets onto the side surface of the waveguide.

Wherein a bending angle of the skirt is less than 90 degrees.

In order to resolve the issue encountered by the prior art, the present invention provides a technical solution by introducing a liquid crystal display device configured with a backlight module which comprises a waveguide including a light exiting surface, and a side surface adjoining the light-exiting surface. An optical film includes a main portion disposed on the existing surface of the waveguide, and a skirt extends from a peripheral of the main portion and adjoining to the side surface of the light-exiting surface. A backboard includes a base and an upright extending from peripheral of the base, the waveguide is disposed on the base, and the upright is spaced with the skirt: and wherein a retaining device is supportably arranged between the upright and the skirt so as to press the skirt onto the side surface of the waveguide.

Wherein the retaining device is securely attached to the backboard.

Wherein the retaining device includes a depressing portion and a fixture arranged onto the depressing portion, and wherein the backboard is defined with a retaining slot in which the depressing portion inserted therein, wherein the depressing portion presses the skirt toward the side surface of the waveguide.

Wherein the depressing portion has a plate-like configuration and includes a pair of main surfaces opposite to each other, one of the main surface is in contact with the skirt, and the other of the main surfaces is in contact with the upright, wherein the retaining slot is defined in the upright.

Wherein the fixture has a T-shape configuration, and the depressing portion and the fixture are integrally formed with an elastic material.

Wherein the depressing portion has a plate-like configuration and includes a pair of main surfaces opposite to each other, and a bridge portion interconnecting the pair of main surfaces, one of the main surface is in contact with the skirt, and the other of the main surfaces is in contact with the upright, wherein the retaining slot is defined in the upright or the bridge, wherein the retaining device is arranged on one of the main surfaces or the bridge.

In conclusion, in the backlight module and the liquid crystal display device incorporated with such a backlight module, the optical film arranged therein is provided with skirt being compliant to the side surface of the waveguide. The upright of the backboard is spaced to the skirt, and a retaining device is used to press the skirt onto the side surface of the waveguide. By this arrangement, the rivet configuration of prior art can be effectively replaced by the current invention so as to save a lot of estate of the backlight module. In addition, the overall configuration of the backboard is simplified which further benefits the working and assembling order of the backlight module. Cost is effectively reduced, and it is more suitable for narrow-border design.

The above described is merely a primary disclosure. In order to readily clarify the technical solution, and therefore implement that technical solution in view of the specification, a detailed description in view of a preferable embodiment in conjunction with accompanied drawings will be given herebelow. By this, other purposes, features and characteristics can be readily appreciated through the detailed description.

In order clearly explain the technology of the embodiment illustrated in the present invention, a brief and concise description will be given along with the accompanied drawings. Apparently, the embodiments illustrated in the drawings are merely some typical embodiments and which can be readily modified by the skilled in the art without any additional laborious efforts so as to transform them into other drawings, and they should all be covered by the appended claims.

Figure 1:
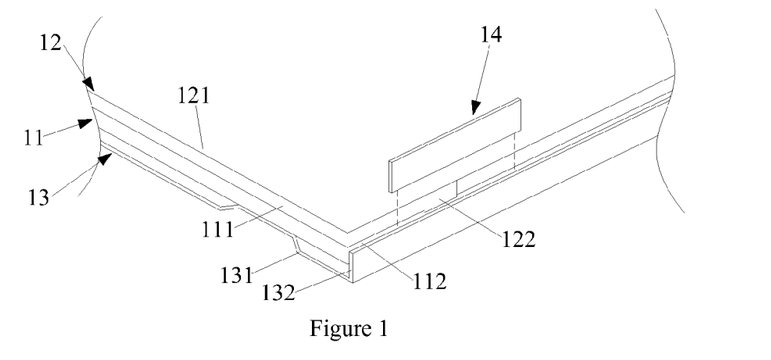
FIG. 1 is an illustrational and structural view of a backlight module made in accordance with the present invention
Figure 1A:
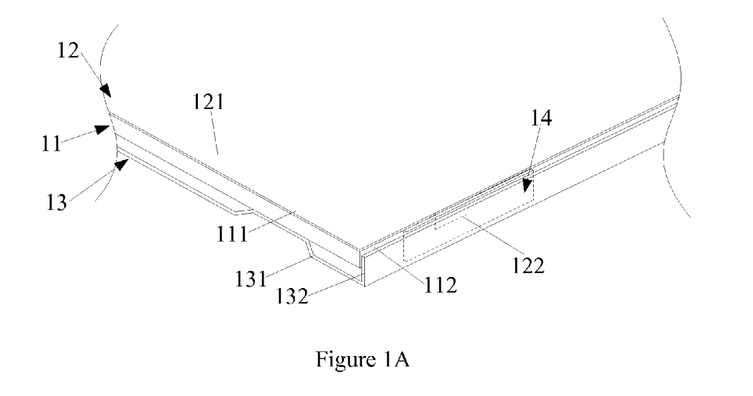
FIG. 1A is an is an illustrational and structural view of a backlight module similar to FIG. 1 with the retaining device positioned between the skirt and the upright.
Figure 1B:
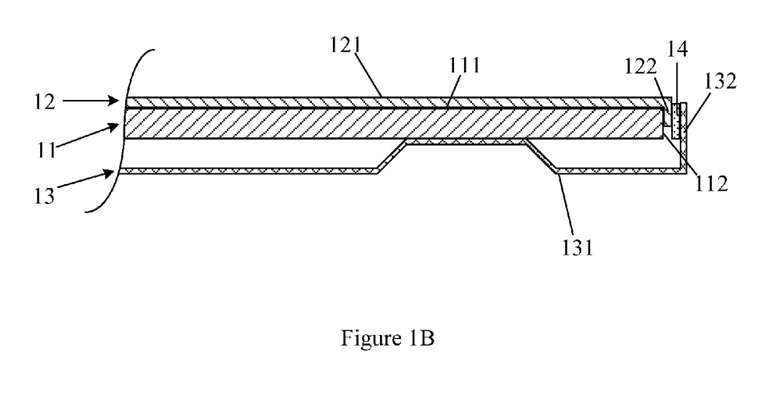
FIG. 1B is an is a cross sectional view illustrating the relationship between the retaining device positioned between the skirt and the upright, and in which the skirt is pushed against a side surface of the waveguide.

Referring to FIG. 1, which is an illustrational and structural view of a backlight module made in accordance with the present invention, along with FIGS. 1A and 1B, an assembled view and a cross sectional view illustrating the invention respectfully. The backlight module includes a waveguide 11, an optical film 12, a backboard 13 and a retaining device 14.

The waveguide 11 includes a light exiting surface 111 and a side surface 112 adjoining to the light exiting surface 111.

The optical film 12 includes a main portion 121 and a skirt 122. The main portion 121 is disposed onto the light existing surface 111 of the waveguide 11, and the skirt 122 of the base 121 is juxtaposed to the side surface 112 of the waveguide 11.

The backboard 13 includes a base 131 and an upright 132. The waveguide 11 is disposed onto the base 131, and the upright 132 and the skirt 122 of the optical film 12 are arranged in parallel to each other.

The retaining device 14 is supportably arranged between the upright 132 and the skirt 122 of the optical film 12 so as to press the skirt 122 of the waveguide 11 onto the site surface 112 of the waveguide 11. By this arrangement, the optical film 2 is securely assembled onto the waveguide 11.

In the current embodiment, the bending angle of the skirt 122 is less than ninety (90) degrees such that when the retaining device 14 presses onto the skirt 122, the skirt 122 will react to creating a reactive force. By this arrangement, certain intensity will be guaranteed.

As compared to the existing prior art, the rivet or dowel pin are omitted so as to simplify the configuration of the backboard 13, while effectively save more estate on the backboard 13.

Figure 2:
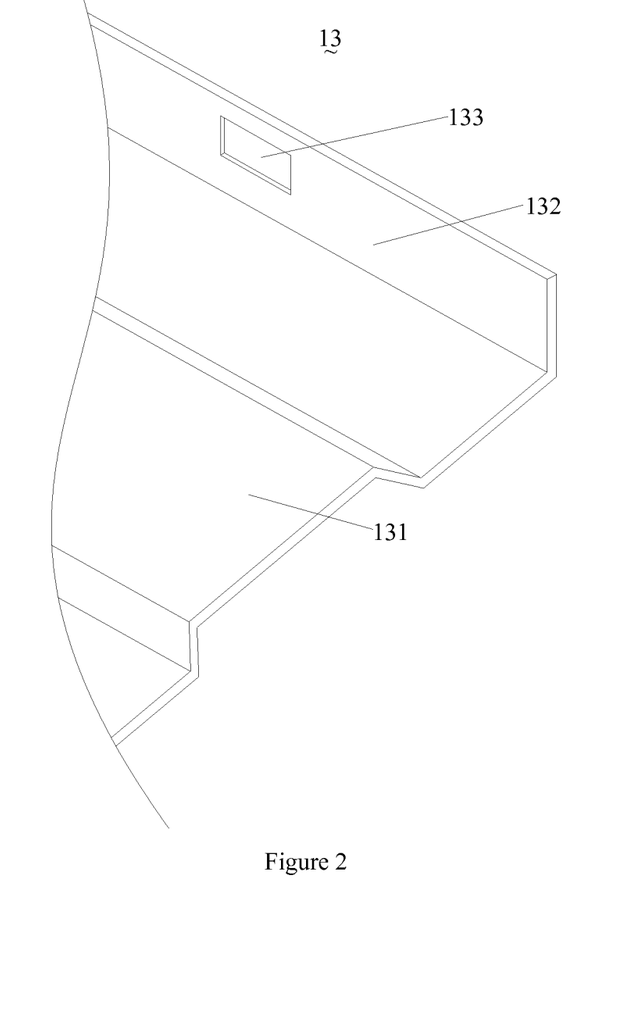
FIG. 2 is a partial and structural view of the backlight module shown in FIG. 1.
Figure 3:
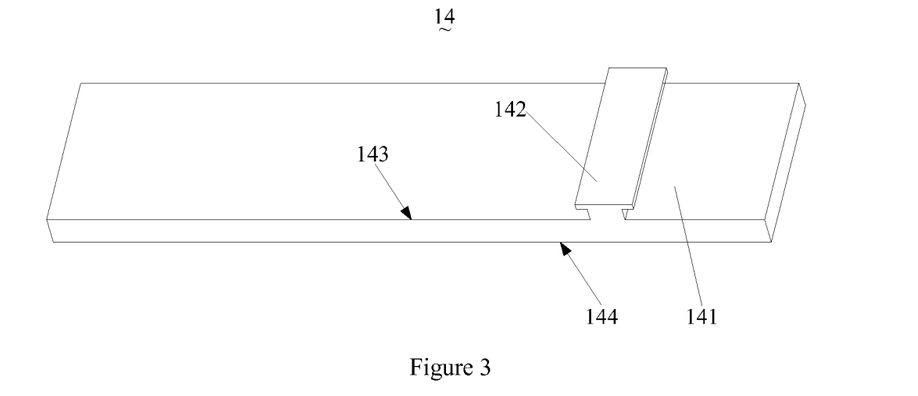
FIG. 3 is a structural view of a retaining device shown in FIG. 1.

Furthermore, the retaining device 14 is attached onto the backboard 13 so as to prevent the backlight from loosing respect to the retaining device 14. Substantially, referring to FIGS. 2 and 3. FIG. 2 is a partial and structural view of the backlight module shown in FIG. 1; and FIG. 3 is a structural view of a retaining device shown in FIG. 1. The retaining device 14 includes a depressing portion 141 and a fixture 142 disposed onto the depressing portion 141. The backboard 13 further defines with a retaining slot 133. The fixture 142 is inserted into the retaining slot 133. The depressing portion 141 presses the skirt 122 of the waveguide 11 onto the side surface 112 of the waveguide 12. In the current embodiment, the retaining slot 133 is defined in the upright 132, and the depressing portion 141 has a plate-like configuration, and includes two main surfaces 143, 144 opposite to each other. The main surface 144 is in contact with the skirt 122, and the fixture 142 is disposed on the main surface 143.

The fixture 142 has a T-shape configuration and the depressing portion 141 and the fixture 142 are integrally formed with elastic material. Since the fixture 142 is elastic, when the fixture 142 is inserted into the retaining slot 133, the fixture 142 can self-retained therein with its own resiliency.

Figure 4:
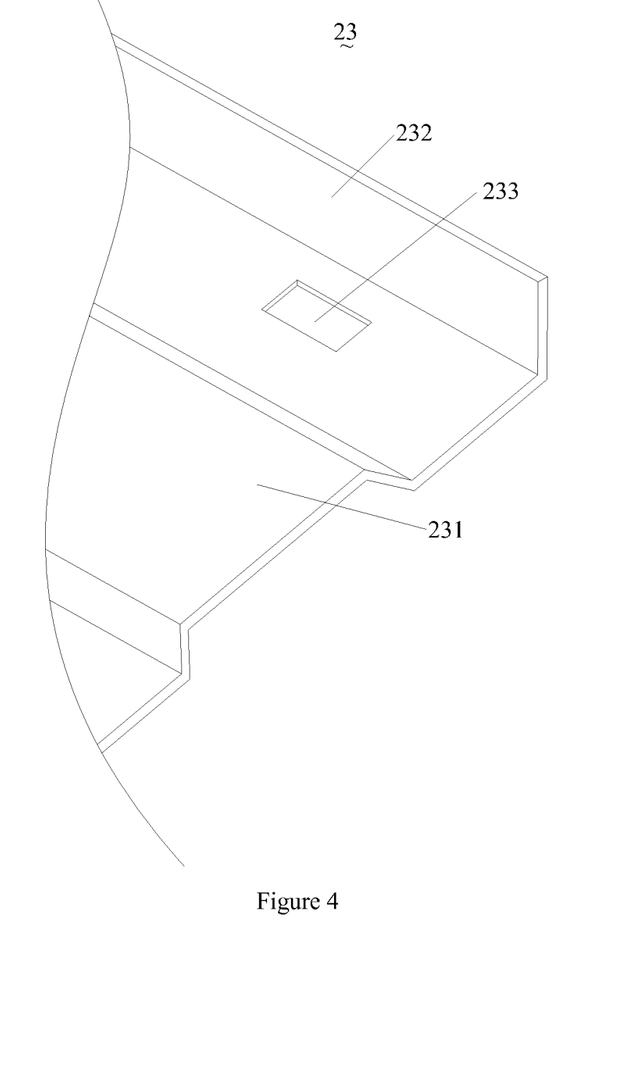
FIG. 4 is a partial and structural view of another embodiment of a backboard of the backlight module made in accordance with the present invention illustrated in FIG. 1.
Figure 5:
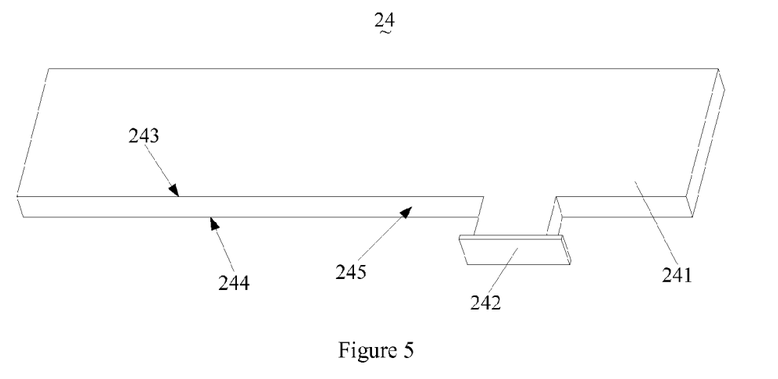
FIG. 5 is a partial and structural view of another embodiment eta retaining device made in accordance with the present invention illustrated in FIG. 1.

Referring to FIGS. 4 and 5, in which FIG. 4 is a partial and structural view of another embodiment of a backboard of the backlight module made in accordance with the present invention illustrated in FIG. 1; and FIG. 5 is a partial and structural view of another embodiment of a retaining device made in accordance with the present invention illustrated in FIG. 1. The backboard 23 and the retaining device 24 can be used to replace the backboard 13 and the retaining device 14 described above.

The retaining device 24 includes a depressing portion 241 and a fixture 242 disposed onto the depressing portion 241. The backboard 23 timber defines with a retaining slot 233.

The fixture 242 is inserted into the retaining slot 233. The depressing portion 241 presses the skirt 122 of the waveguide 11 onto the side surface 112 of the waveguide 12. In the current embodiment, the retaining slot 233 is defined in the bottom 231 of the backboard 23. The depressing portion 241 has a plate-like configuration, and includes two main surfaces 243, 244 opposite to each other, and a bridge 245 interconnecting the main surfaces 243 and 244. The main surface 243 is in contact with the upright 232, and the main surface 244 is in contact with the skirt 122. The fixture 242 is disposed on the bridge 245.

The fixture 242 has a T-shape configuration and the depressing portion 241 and the fixture 242 are integrally fumed with elastic material. Since the fixture 242 is elastic, when the fixture 242 is inserted into the retaining slot 233, the fixture 242 can self-retained therein with its own resiliency.

Figure 6:
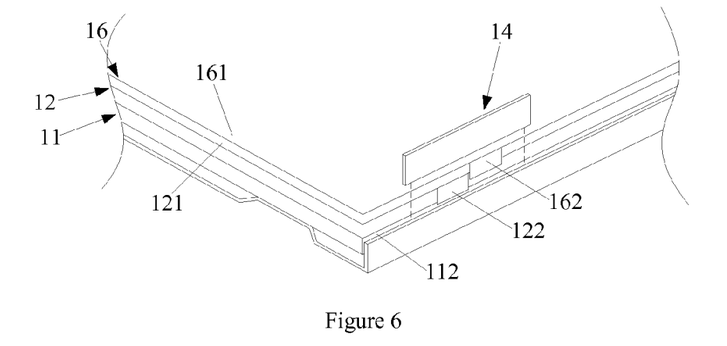
FIG. 6 is a partial and structural view of a backlight module made in accordance with the present invention.

Referring to FIG. 6, which is a partial and structural view of a backlight module made in accordance with the present invention.

Based on the current implementation, the backlight module further includes an optical film 16 which stacked with the optical film 12. The optical film 16 includes a main portion 161 and a skirt 162. The main portion 161 is disposed onto the main portion 121 of the optical film 12, and the skirt 162 extends from peripheral of the main portion 161 and then is juxtaposed onto the side surf 112 of the waveguide 11. It should be noted that the skirt 122 of the optical film 12 and the skirt 162 of the optical film 16 are offset from each other along the side surface 112 of the waveguide 11. The retaining device 14 effectively presses the skirt 122 of the optical film 12 and the skirt 162 of the optical film 16 onto the side surface 112 of the waveguide 11.

In the current embodiment, only one retaining device 14 will be sufficed to position the optical film 12 and the optical film 16, and further reduce the manufacturing cost.

It should be readily understood that the quantity of the optical film should not be limited, while it can be readily increased or reduced in view of the field requirements. Correspondingly, the retaining device 14 can be used to position more optical films.

The present invention further provides a liquid crystal display device incorporated with the backlight module disclosed above. The configuration of the liquid crystal display device can be readily understood in view of the existing configuration and no further description will be given.

With the above description, in the backlight module and the liquid crystal display device incorporated with such a backlight module, the optical film arranged therein is provided with skirt being compliant to the side surface of the waveguide. The upright of the backboard is spaced to the skirt, and at retaining device is used to press the skirt onto the side surface of the waveguide. By this arrangement, the rivet configuration of prior art can be effectively replaced by the current invention so as to save a lot of estate of the backlight module. In addition, the overall configuration of the backboard is simplified which further benefits the working and assembling order of the backlight module. Cost is effectively reduced, and it is more suitable for narrow-border design.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A backlight module, comprising
   a waveguide including a light exiting surface, and a side surface adjoining the light-exiting surface;
   an optical film including a main portion disposed on the existing surface of the waveguide, and a skirt extending from a peripheral of the main portion and adjoining to the side surface of the light-exiting surface;
   a backboard including a base and an upright extending from peripheral of the base, the waveguide being disposed on the base, and the upright being spaced with the skirt, a retaining slot defined in the backboard;
   a retaining device attached to the backboard, and including a depressing portion and a fixture arranged onto the depressing portion, the depressing portion being supportably arranged between the upright and the skirt so as to press the skirt onto the side surface of the waveguide; and
   wherein the depressing portion has a plate-like configuration and includes a pair of main surfaces opposite to each other, and a bridge portion interconnecting the pair of main surfaces, one of the main surface is in contact with the skirt, and the other of the main surfaces is in contact with the upright, wherein the retaining slot is defined in the upright or the bridge, wherein the retaining device is arranged on one of the main surfaces or the bridge.

2. The backlight module as recited in claim 1, wherein the fixture has a T-like configuration.

3. The backlight module as recited in claim 2, wherein the depressing portion and the fixture are integrally formed with an elastic material.

4. The backlight module as recited in claim 1, wherein the optical film includes a first optical sheet, and a second optical sheet stacked together, a skirt of the first optical sheet and a skirt of the second optical sheet are offset from each other on the side surface of the waveguide, wherein the retaining device presses the skirts of the first and second optical sheets onto the side surface of the waveguide.

5. The backlight module as recited in claim 1, wherein a bending angle of the skirt is less than 90 degrees.

6. A backlight module, comprising
   a waveguide including a light exiting surface, and a side surface adjoining the light-exiting surface;
   an optical film including a main portion disposed on the existing surface of the waveguide, and a skirt extending from a peripheral of the main portion and adjoining to the side surface of the light-exiting surface;
   a backboard including a base and an upright extending from peripheral of the base, the waveguide being disposed on the base, and the upright being spaced with the skirt; and
   a retaining device being supportably arranged between the upright and the skirt so as to press the skirt onto the side surface of the waveguide.

7. The backlight module as recited in claim 6, wherein the retaining device is securely attached to the backboard.

8. The backlight module as recited in claim 7, wherein the retaining device includes a depressing portion and a fixture arranged onto the depressing portion, and wherein the backboard is defined with a retaining slot in which the depressing portion inserted therein, wherein the depressing portion presses the skirt toward the side surface of the waveguide.

9. The backlight module as recited in claim 8, wherein the depressing portion has a plate-like configuration and includes a pair of main surfaces opposite to each other, one of the main surface is in contact with the skirt, and the other of the main surfaces is in contact with the upright, wherein the retaining slot is defined in the upright.

10. The backlight module as recited in claim 9, wherein the fixture has a T-shape configuration, and the depressing portion and the fixture are integrally formed with an elastic material.

11. The backlight module as recited in claim 8, wherein the depressing portion has a plate-like configuration and includes a pair of main surfaces opposite to each other, and a bridge portion interconnecting the pair of main surfaces, one of the main surface is in contact with the skirt, and the other of the main surfaces is in contact with the upright, wherein the retaining slot is defined in the upright or the bridge, wherein the retaining device is arranged on one of the main surfaces or the bridge.

12. The backlight module as recited in claim 11, wherein the fixture has a T-shape configuration, and the depressing portion and the fixture are integrally formed with an elastic material.

13. The backlight module as recited in claim 6, wherein the optical film includes a first optical sheet, and a second optical sheet stacked together, a skirt of the first optical sheet and a skirt of the second optical sheet are offset from each other on the side surface of the waveguide, wherein the retaining device presses the skirts of the first and second optical sheets onto the side surface of the waveguide.

14. The backlight module as recited in claim 6, wherein a bending angle of the skirt is less than 90 degrees.

15. A liquid crystal display device configured with a backlight module, comprising
a waveguide including a light exiting surface, and a side surface adjoining the light-exiting surface;
an optical film including a main portion disposed on the existing surface of the waveguide, and a skirt extending from a peripheral of the main portion and adjoining to the side surface of the light-exiting surface;
a backboard including a base and an upright extending from peripheral of the base, the waveguide being disposed on the base, and the upright being spaced with the skirt; and
a retaining device being supportably arranged between the upright and the skirt so as to press the skirt onto the side surface of the waveguide.

16. The liquid crystal display device as recited in claim 15, wherein the retaining device is securely attached to the backboard.

17. The liquid crystal display device as recited in claim 16, wherein the retaining device includes a depressing portion and a fixture arranged onto the depressing portion, and wherein the backboard is defined with a retaining slot in which the depressing portion inserted therein, wherein the depressing portion presses the skirt toward the side surface of the waveguide.

18. The liquid crystal display device as recited in claim 17, wherein the depressing portion has a plate-like configuration and includes a pair of main surfaces opposite to each other, one of the main surface is in contact with the skirt, and the other of the main surfaces is in contact with the upright, wherein the retaining slot is defined in the upright.

19. The liquid crystal display device as recited in claim 18, wherein the fixture has a T-shape configuration, and the depressing portion and the fixture are integrally formed with an elastic material.

20. The liquid crystal display device as recited in claim 17, wherein the depressing portion has a plate-like configuration and includes a pair of main surfaces opposite to each other, and a bridge portion interconnecting the pair of main surfaces, one of the main surface is in contact with the skirt, and the other of the main surfaces is in contact with the upright, wherein the retaining slot is defined in the upright or the bridge, wherein the retaining device is arranged on one of the main surfaces or the bridge.

* * * * *